United States Patent

[11] 3,559,910

| | | |
|---|---|---|
| [72] | Inventor | Billy W. Babb<br>Campbell, Calif. |
| [21] | Appl. No. | 783,977 |
| [22] | Filed | Dec. 16, 1968 |
| [45] | Patented | Feb. 2, 1971 |
| [73] | Assignee | Robert R. Walker, Jr.<br>San Jose, Calif. |

[54] PLASTIC PIPE HANGER
5 Claims, 6 Drawing Figs.

[52] U.S. Cl. .................................... 248/59,
248/74
[51] Int. Cl. .................................... F16l 3/14,
F16l 9/12
[50] Field of Search ........................... 248/74,
74PB, 59, 62; 24/73.7, 255SL; 285/197, S.F.

[56] References Cited
UNITED STATES PATENTS

| 1,362,244 | 12/1920 | Farley .................... | 248/59 |
|---|---|---|---|
| 3,054,585 | 9/1962 | Roberts .................. | 248/74 |
| 3,090,826 | 5/1963 | Cochran ................. | 248/74X |
| 3,136,515 | 6/1964 | Potruch ................. | 248/62 |
| 3,161,210 | 12/1964 | Loof ..................... | 138/128 |
| 3,330,517 | 7/1967 | Zimmerman ........... | 248/62 |
| 3,432,199 | 3/1969 | Santucci ................ | 248/74X |
| 3,169,005 | 2/1965 | Wallach ................. | 248/74 |
| 3,266,109 | 8/1966 | Thomas ................. | 24/20 |

FOREIGN PATENTS

| 1,022,820 | 11/1963 | Great Britain ......... | 24/73.7 |

OTHER REFERENCES
F. W. Hill, IBM TECHNICAL DISCLOSURE BULLETIN, Vol. 2 No. 1, dated June 1959, Class 248— 74.

*Primary Examiner*—Chancellor E. Harris
*Attorney*—Jack M. Wiseman

ABSTRACT: A hanger for a pipe constructed of a collar formed with an interstice and being bendable between a pipe-engaging position and a pipe-releasing position. The collar is provided with interlocking members for releasably securing the collar in pipe-engaging position and means are provided for suspending the collar from a supporting structure.

PATENTED FEB 2 1971

3,559,910

INVENTOR.
Billy W. Babb

BY Jack M. Wiseman

Attorney

PLASTIC PIPE HANGER

BACKGROUND OF THE INVENTION

The present invention relates to hangers for pipe, and more particularly to a hanger which is especially suited for the suspension of plastic piping.

Plastic piping has been coming into increasing use in recent years. Such piping offers numerous advantages, including flexibility and lightness in weight. Along with the advantages of plastic piping, however, have arisen certain disadvantages with respect to the installation of such piping, and the maintenance thereof in a suitably installed position. Pipe hangers of conventional type have usually been employed for this purpose. Because of the lightness in weight of the plastic piping, it has often been necessary to utilize an adhesive material for adequate securing of the piping to the hanger. The application of such an adhesive material has been rather time-consuming and costly.

Hangers which have been specially designed for the suspension of plastic piping have recently come into use. In employing any of these hangers, it has usually been unnecessary to utilize any adhesive material for securing the plastic piping to the hanger. However, the installation of the hanger itself has often required the application of an adhesive material, such as a cement; or has required some other time-consuming and costly operation.

SUMMARY OF THE INVENTION

The present invention provides a hanger for a pipe the use of which hanger serves to overcome the above-discussed problems existing in the prior art with respect to the suspension of plastic piping. The hanger of the invention is installed in pipe-supporting position comparatively rapidly and comparatively cheaply, as a consequence of the elimination of any need for the use of an adhesive material. Such hanger, furthermore, serves to readily receive a pipe to be suspended thereby. In addition, the hanger of the invention provides secure support for a pipe suspended thereby without the use of an adhesive material. To achieve the foregoing, the pipe hanger of the present invention employs interlocking members for releasably receiving the collar thereof in pipe-engaging position.

BRIEF DESCRIPTION OF THE DRAWINGS

The advantages of the present invention will become apparent to one skilled in the art, from the following description when read in conjunction with the accompanying drawings, in which.

DESCRIPTION OF THE PREFERRED EMBODIMENT

Figure 1:
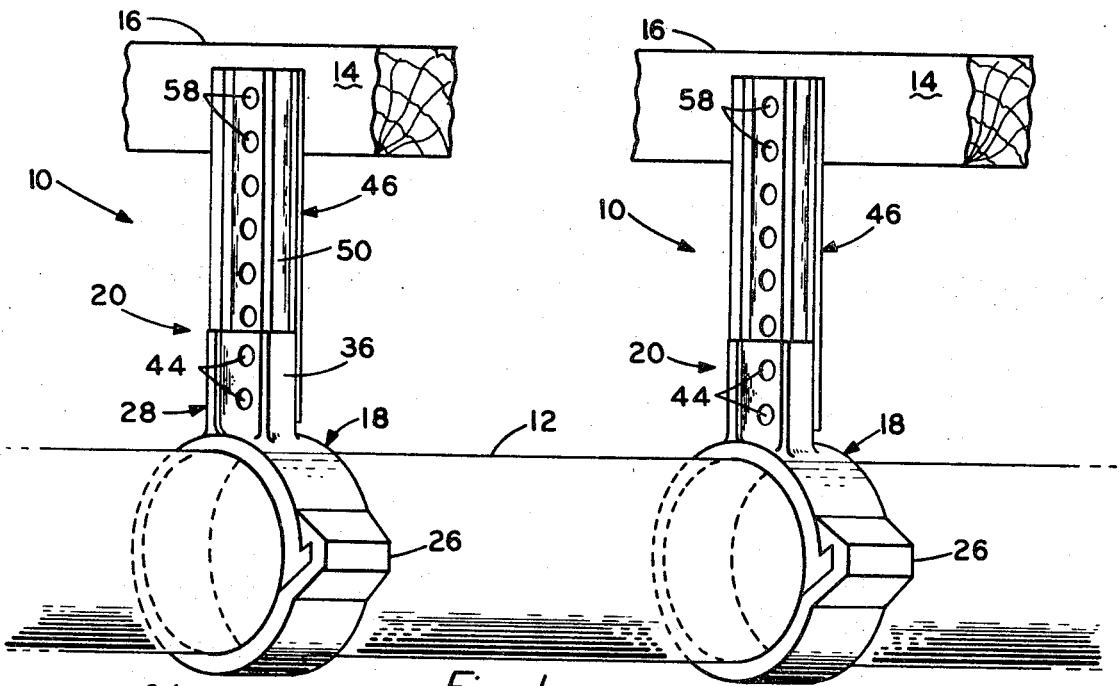
FIG. 1 is a perspective view of a plurality of pipe hangers constructed in accordance with the invention, and being shown mounted on a beam, a pipe being shown supported by such pipe hangers.

Referring to the drawings, and particularly to FIG. 1, there are shown a plurality of pipe hangers 10 of the invention, in position for suspending a plastic pipe 12 from the surface 14 of a conventional supporting beam 16. Each hanger 10 is constructed of a somewhat flexible plastic material, such as, e.g., acrylonitrile-butadiene-styrene.

Each pipe hanger 10 provides a collar 18, and a suspension assembly 20. The collar 18 (See also FIGS. 3 and 3) is formed with an interstice 22. At the opposite sides of the interstice 22 are located two hook shaped closure members 24 and 26, respectively. Opposite the interstice 22, the collar 18 is provided with a stressed portion A.

Figure 4:
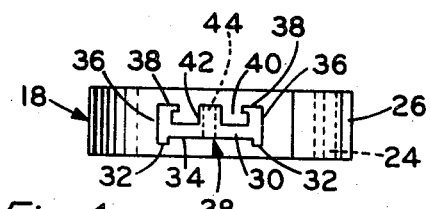
FIG. 4 is a top plan view of the collar and mounting member of FIG. 3.

Included in the suspension assembly 20, and integral with the collar 18, is a mounting member 28. The member 28 provides a base wall 30, which is of generally rectangular cross section (See also FIG. 4). Projecting from one face of the wall 30, and located at opposite ends of the latter, respectively, are a pair of parallel-extending flanges 32, which define a recess 34. Projecting from the opposite face of the wall 30 are a pair of flanges 36, each of which terminates in a flange 38 extending parallel to the wall 30. The flanges 36, 38 define a recess 40. Integral with the wall 30, and positioned within the recess 40 is a centrally located projection 42, of generally rectangular cross section. Extending through both the wall 30 and the projection 42 are a pair of centrally located apertures 44, through each of which passes a pin, or other conventional attachment member 45.

Figure 5:
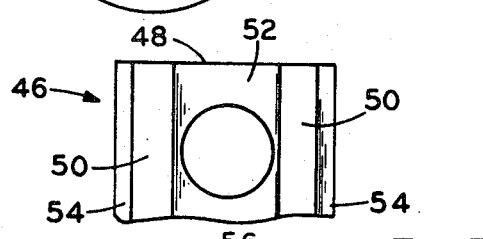
FIG. 5 is an enlarged front-elevational view of a suspension strap, included in each of the pipe hangers of FIG. 1, and being partly broken away.
Figure 6:
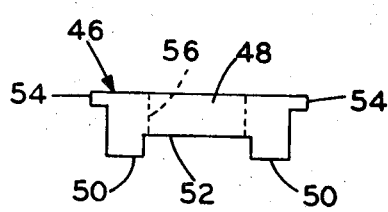
FIG. 6 is a top plan view of the suspension strap of FIG. 5.

The suspension assembly 20 further includes a suspension strap 46 (See also FIGS. 5 and 6). The strap 46 provides a comparatively long base wall 48. A pair of flanges 50 project from the one fact of the wall 48, and at the opposite sides thereof, respectively, to define a recess 52. The flanges 50 and the recess 52 are dimensioned for engagement by the member 28, in a manner to be described hereinbelow. A pair of extension flanges 54 project from the wall 48, at the opposite sides of the latter, respectively. A plurality of apertures 56 extend through the wall 48, being positioned at the center of the recess 52. The two lowermost apertures 56 are positioned for registration with the apertures 44 of the member 28, respectively, for a purpose to be described hereinbelow.

In the use of one of the hangers 10, the strap 46 is initially secured to the surface 14 by a pair of pins, or other conventional attachment members 58, which pass through two adjacent apertures 56. Any pair of apertures, excepting the two lowermost apertures 56 may be chosen, depending upon the height at which it is desired that the collar 18 be positioned. The mounting member 28 is then placed in engagement with the lower end portion of the strap 46, and in the position seen in FIG. 1. The two flanges 38 of the mounting member 28 will then engage the two flanges 50 of the strap 46, respectively. At the same time, the projection 42 of the mounting member 28 will be inserted within the recess 52 of the strap 46, and in abutment with the wall 48. The apertures 44 of the member 28 will be positioned in registration with the lowermost pair of apertures 56 of the strap 46. When such engagement has been effected, the pins 45 may be employed for securing the member 28 to the strap 46.

Figure 2:
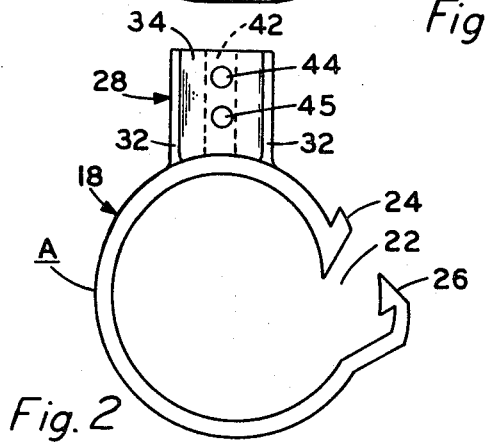
FIG. 2 is an enlarged end-elevational view of a collar and mounting member included in each of the pipe hangers of FIG. 1, the collar being shown in an open position for receiving a pipe to be supported thereby.

The collar 18 may then be moved into the open position thereof shown in FIG. 2, in which the member 26 is disengaged from the member 24. Such movement is facilitated by the provision of the stressed portion A. The pipe 12 may then be inserted within the collar 18, and the latter moved into the closed position shown in FIG. 3, in which the member 26 engages the member 24. The pipe 12 will then be securely mounted within the collar 18.

If desired, the mounting member 28 may be reinforced by the insertion of a steel plate, or the like, within the recess 34.

When the pipe 12 is to be dismounted, the member 26 may be disengaged from the member 24, and the collar 18 moved into the open position shown in FIG. 2. The pipe 12 may then be easily removed from the collar 18.

Figure 3:
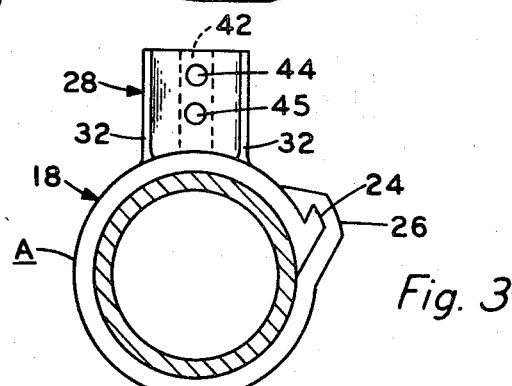
FIG. 3 is a view similar to FIG. 2, the collar being shown in a closed position, a pipe supported thereby being shown in cross section.

It will thus be seen that the member 28 is secured to the strap 46, and that the collar 18 is maintained in the closed position shown in FIG. 3, without the use of an adhesive material. At the same time, the complete encirclement of the pipe 12 by the collar 18 serves to maintain the latter in installed position, without the use of an adhesive material.

It is to be understood that modifications and variations of the embodiment of the invention disclosed herein may be resorted to without departing from the spirit of the invention and the scope of the appended claims.

I claim:

1. A hanger for pipe comprising:
a. a flexible collar formed with an interstice and being adapted for bending between a pipe-engaging position and a pipe-releasing position, said collar being provided with means for releasably securing said collar in the pipe-engaging position including an integral protrusion adjacent one side of the interstice and a recess adjacent the other side of the interstice, said recess being adapted to interlock with said protrusion in contour conforming mating relation for maintaining the inner wall of said collar substantially cylindrical; and
b. means projecting radially from said collar and spaced angularly from said interstice for suspending said collar from a support structure, said securing means provide interlockable members located at opposite sides of said interstice, said protrusion being hooked-shaped and said recess being hooked-shaped, said protrusion including three exterior leg surfaces with first and second leg surfaces interconnected by a third surface, said first and second surfaces being substantially parallel relative to one another.

2. A hanger for pipe comprising:
a. a flexible collar formed with an interstice and being adapted for bending between a pipe-engaging position and a pipe-releasing position, said collar being provided with means for releasably securing said collar in pipe-engaging position, said means for releasably securing said collar in the pipe-engaging position including an integral protrusion adjacent one side of the interstice and a recess adjacent the other side of the interstice, said recess being adapted to interlock with said protrusion in contour conforming mating relation for maintaining the inner wall of said collar substantially cylindrical; and
b. means projecting radially from said collar and spaced angularly from said interstice for suspending said collar from a support structure, said suspending means provide a mounting member secured to said collar, and a suspension strap adapted for attachment to said support structure, said mounting member and said suspension strap being adapted to be secured together, said mounting member is formed with a recess adapted to receive a reinforcement member.

3. A hanger for pipe comprising:
a. a flexible collar formed with an interstice and being adapted for bending between a pipe-engaging position and a pipe-releasing position, said collar being provided with means for releasably securing said collar in pipe-engaging position, said means for releasably securing said collar in the pipe-engaging position including an integral protrusion adjacent one side of the interstice and a recess adjacent the other side of the interstice, said recess being adapted to interlock with said protrusion in contour conforming mating relation for maintaining the inner wall of said collar substantially cylindrical; and
b. means projecting radially from said collar and spaced angularly from said interstice for suspending said collar from a support structure, said suspending means provide a mounting member secured to said collar, and a suspension strap adapted for attachment to said support structure, said mounting member and said suspension strap being adapted to be secured together, said suspension strap is formed with a pair of flanges defining a recess, said mounting member being adapted to engage said flanges, said mounting member providing a projection insertable within said recess.

4. A hanger for pipe comprising:
a. a flexible collar formed with an interstice and being adapted for bending between a pipe-engaging position and a pipe-releasing position, said collar being provided with means for releasably securing said collar in pipe-engaging position; and
b. means projecting radially from said collar and spaced angularly from said interstice for suspending said collar from a support structure, said suspending means provide a mounting member secured to said collar, and a suspension strap adapted for attachment to said support structure, said mounting member and said suspension strap being adapted to be secured together, said suspension strap is formed with a pair of flanges defining a recess, said mounting member being adapted to engage said flanges, said mounting member providing a projection insertable within said recess, said mounting member is provided with a pair of flanges for engaging the flanges of said suspension strap.

5. A hanger for pipe comprising a flexible collar formed with an expansible opening for receiving the exterior wall of a pipe, said collar being bendable between a pipe-engaging position and a pipe-releasing position, said collar being formed with securing means for releasably securing said collar in pipe-engaging position, the bending of said collar between the pipe engaging position and the pipe-releasing position varies the size of said opening, said securing means including an integral protrusion and a recess, said recess being adapted to interlock with said protrusion in contour conforming mating relation for maintaining the inner wall of said collar substantially cylindrical, and suspending means projecting radially from said collar and spaced angularly from said securing means for suspending said collar from a support structure, said protrusion being hooked-shaped and said recess being hooked-shaped, said protrusion including three exterior leg surfaces with first and second leg surfaces interconnected by a third surface, said first and second surfaces being substantially parallel relative to one another.